(12) United States Patent
Takahashi

(10) Patent No.: US 11,164,569 B2
(45) Date of Patent: Nov. 2, 2021

(54) SOUND SIGNAL PROCESSING APPARATUS

(71) Applicant: DENSO TEN Limited, Kobe (JP)

(72) Inventor: Makoto Takahashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/822,134

(22) Filed: Mar. 18, 2020

(65) Prior Publication Data

US 2020/0395009 A1    Dec. 17, 2020

(30) Foreign Application Priority Data

Jun. 13, 2019    (JP) .............................. JP2019-110676

(51) Int. Cl.
| | | |
|---|---|---|
| *G10L 15/20* | (2006.01) | |
| *G10L 21/02* | (2013.01) | |
| *H04B 3/23* | (2006.01) | |
| *H04S 7/00* | (2006.01) | |
| *H04M 1/60* | (2006.01) | |

(52) U.S. Cl.
CPC .............. *G10L 15/20* (2013.01); *G10L 21/02* (2013.01); *H04B 3/23* (2013.01); *H04M 1/60* (2013.01); *H04S 7/307* (2013.01)

(58) Field of Classification Search
CPC ... G10L 21/02; G10L 21/0316; G10L 21/028; G10L 2021/02082; G10L 15/20; H04M 9/082; H04M 9/08; H04M 1/60; H04M 1/6083; H04R 3/04; H04B 3/23; H04S 7/307

See application file for complete search history.

(56) References Cited

U.S. PATENT DOCUMENTS

| | | | | |
|---|---|---|---|---|
| 6,160,886 A | * | 12/2000 | Romesburg | ........... H04M 9/082 379/406.05 |
| 2002/0181698 A1 | * | 12/2002 | Takahashi | ........... G10L 21/0208 379/406.01 |
| 2009/0010445 A1 | * | 1/2009 | Matsuo | ................. H04M 9/082 381/66 |

FOREIGN PATENT DOCUMENTS

| | | |
|---|---|---|
| JP | 2000-353989 A | 12/2000 |
| JP | 2016-034119 A | 3/2016 |

* cited by examiner

*Primary Examiner* — Yogeshkumar Patel
(74) *Attorney, Agent, or Firm* — Oliff PLC

(57) ABSTRACT

In a sound signal processing apparatus, a communication part receives a far-end sound signal from a smartphone serving as a sound source. A correlation value calculator calculates a correlation value indicative of a correlation between the far-end sound signal and a sending sound signal that includes an echo signal deriving from the far-end sound signal. When the correlation value is equal to or smaller than a predetermined suppression threshold, a determiner determines to suppress the far-end sound signal. When the determiner has determined to suppress the far-end sound signal, a suppressor suppresses the far-end sound signal, and outputs the suppressed far-end sound signal to a sound volume adjuster.

6 Claims, 8 Drawing Sheets

SOUND SIGNAL PROCESSING APPARATUS

BACKGROUND OF THE INVENTION

Field of the Invention

The invention relates to a sound signal processing apparatus.

Description of the Background Art

An echo is one of factors that decrease quality in sound communication by telephone and the like. In order to prevent lower quality in the sound communication, a sound signal processing apparatus, called echo canceller, is mounted in a sound communication apparatus, such as a telephone.

For example, the echo canceller is used for a handsfree device. In a conventional echo canceller, a non-linear circuit gives a characteristic similar to a non-linear characteristic that occurs at an analogue output volume portion and/or after the portion, to a sound signal to be input to an adaptive filter. A sound signal to be output from the adaptive filter is subtracted from a sound signal input via a microphone. Thus, an echo included in the sound signal input via the microphone is cancelled.

The non-linear characteristic occurs due to saturation of the sound signal in an amplifier included in an adjuster, such as the analogue output volume portion. The sound signal having the non-linear characteristic may produce a cracking sound that is output from a loudspeaker. When the cracking sound is output from the loudspeaker, it is difficult for a user to understand the sound.

However, the conventional echo canceller does not intend to suppress a distortion of the sound signal to be output from the adjuster. In other words, the conventional echo canceller cannot suppress the distortion of the sound signal to be input to the loudspeaker.

SUMMARY OF THE INVENTION

According to one aspect of the invention, a sound signal processing apparatus that receives a first sound signal from a sound source, and that outputs the first sound signal to a volume adjuster, includes a correlation value calculator, a determiner, and a suppressor. The correlation value calculator calculates a correlation value indicative of a correlation between the first sound signal and a second sound signal that includes an echo signal deriving from the first sound signal. The determiner determines, based on the correlation value calculated by the correlation value calculator, whether or not to suppress a level of the first sound signal. A suppressor, when the determiner has determined to suppress the level of the first sound signal, suppresses the level of the first sound signal, and outputs, to the volume adjuster, the first sound signal having the level that has been suppressed.

Therefore, an object of the invention is to provide a sound signal processing apparatus that suppresses a distortion of a sound signal to be input to a loudspeaker.

These and other objects, features, aspects and advantages of the invention will become more apparent from the following detailed description of the invention when taken in conjunction with the accompanying drawings.

DESCRIPTION OF THE EMBODIMENTS

With reference to the drawings, embodiments of the invention will be described below. Same numerical references are given to same or equivalent parts/portions, and explanation thereof will be omitted.

[1. Configuration]

[1.1 Configuration of Vehicle-Mounted Handsfree System 100]

Figure 1:
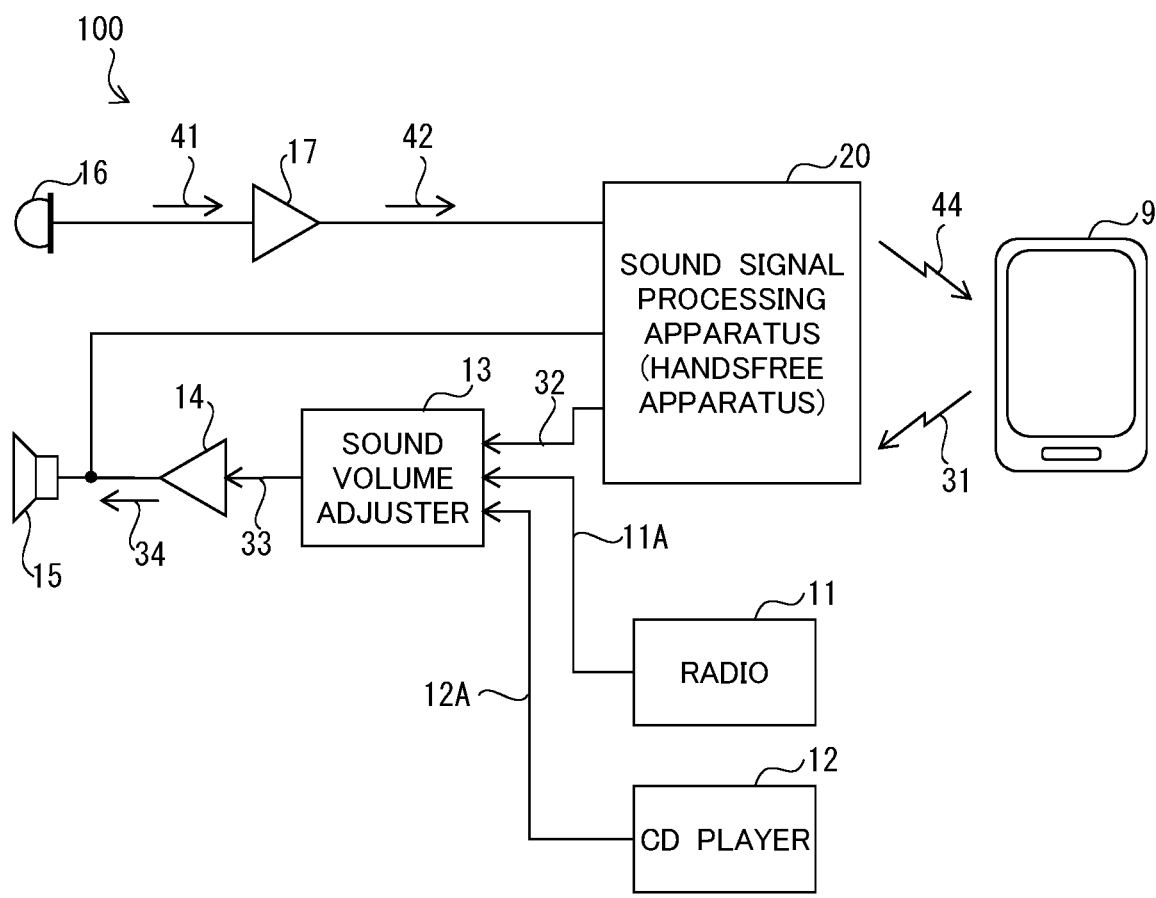
FIG. 1 is a functional block diagram illustrating a configuration of a vehicle-mounted handsfree system including a sound signal processing apparatus of a first embodiment of the invention.

FIG. 1 is a functional block diagram illustrating a configuration of a vehicle-mounted handsfree system 100 including a sound signal processing apparatus 20 of a first embodiment.

As shown in FIG. 1, the vehicle-mounted handsfree system 100 is mounted in a vehicle, such as a car. The vehicle-mounted handsfree system 100 includes a radio 11, a compact disc (CD) player 12, a sound volume adjuster 13, amplifiers 14 and 17, a loudspeaker 15, a microphone 16, and the sound signal processing apparatus 20. In this embodiment, the sound signal processing apparatus 20 is a handsfree apparatus provided in the vehicle.

The radio 11 receives radio broadcasting and generates a sound signal 11A. The sound signal 11A is digital. The radio 11 outputs the generated sound signal 11A to the sound volume adjuster 13.

The CD player 12 plays back a CD, not illustrated, and generates a sound signal 12A. The sound signal 12A is digital. The CD player 12 outputs the generated sound signal 12A to the sound volume adjuster 13.

The sound volume adjuster 13 receives a sound signal from one apparatus selected by a driver of the vehicle from amongst the radio 11, the CD player 12 and the sound signal processing apparatus 20. The sound volume adjuster 13 adjusts a level of the received sound signal to a level that the driver has been set, and converts the digital sound signal adjusted to the set level into an analogue sound signal. The sound volume adjuster 13 outputs the converted analogue sound signal to the amplifier 14. In this embodiment, the sound volume adjuster 13 functions as an adjuster that adjusts a level of a far-end sound signal 32 output from the sound signal processing apparatus 20.

Below will be described the amplifier 14, the loudspeaker 15, and the microphone 16 in a case where the apparatus selected by the driver is the sound signal processing apparatus 20, as an example. In this case, the sound volume adjuster 13 outputs, to the amplifier 14, the far-end sound signal 32 of which a volume has been adjusted, as a far-end sound signal 33. Here, 'level_ of the sound signal is equivalent to a volume of a sound that is output from the loudspeaker 15.

The amplifier 14 amplifies the far-end sound signal 33 received from the sound volume adjuster 13. The amplifier 14 outputs the amplified far-end sound signal 33, as a far-end sound signal 34, to the loudspeaker 15 and the sound signal processing apparatus 20. In other words, in this embodiment, the amplifier 14 functions as an adjuster that adjusts the level of the far-end sound signal 32 output from the sound signal processing apparatus 20.

The loudspeaker 15 receives the far-end sound signal 34 from the amplifier 14. The loudspeaker 15 converts the far-end sound signal 34 to a sound, and outputs the sound to a cabin of the vehicle.

The microphone 16 inputs a sound in the cabin and generates a sending sound signal 41. The microphone 16 outputs the generated sending sound signal 41 to the amplifier 17.

The amplifier 17 receives the sending sound signal 41 from the microphone 16, and amplifies the received sending sound signal 41. The amplifier 17 outputs the amplified sending sound signal 41 as a sending sound signal 42 to the sound signal processing apparatus 20.

The sound signal processing apparatus 20 receives a far-end sound signal 31 from a smartphone 9, and outputs the far-end sound signal 32 to the sound volume adjuster 13. The smartphone 9 is equivalent to a sound source of the sound signal processing apparatus 20. The far-end sound signal 32 is either the far-end sound signal 31 having the suppressed level or a signal same as the far-end sound signal 31 from the smartphone 9.

The sound signal processing apparatus 20 receives the far-end sound signal 34 from the amplifier 14 and the sending sound signal 42 from the amplifier 17. The sound signal processing apparatus 20 cancels an echo signal included in the sending sound signal 42 by use of the far-end sound signal 31 received from the smartphone 9. The echo signal derives from a sound output from the loudspeaker 15 amongst sounds input into the microphone 16. The sound signal processing apparatus 20 sends to the smartphone 9 a sending sound signal 44 that is obtained as a result of cancellation of the echo signal.

[1.2. Configuration of Sound Signal Processing Apparatus 20]

Figure 2:
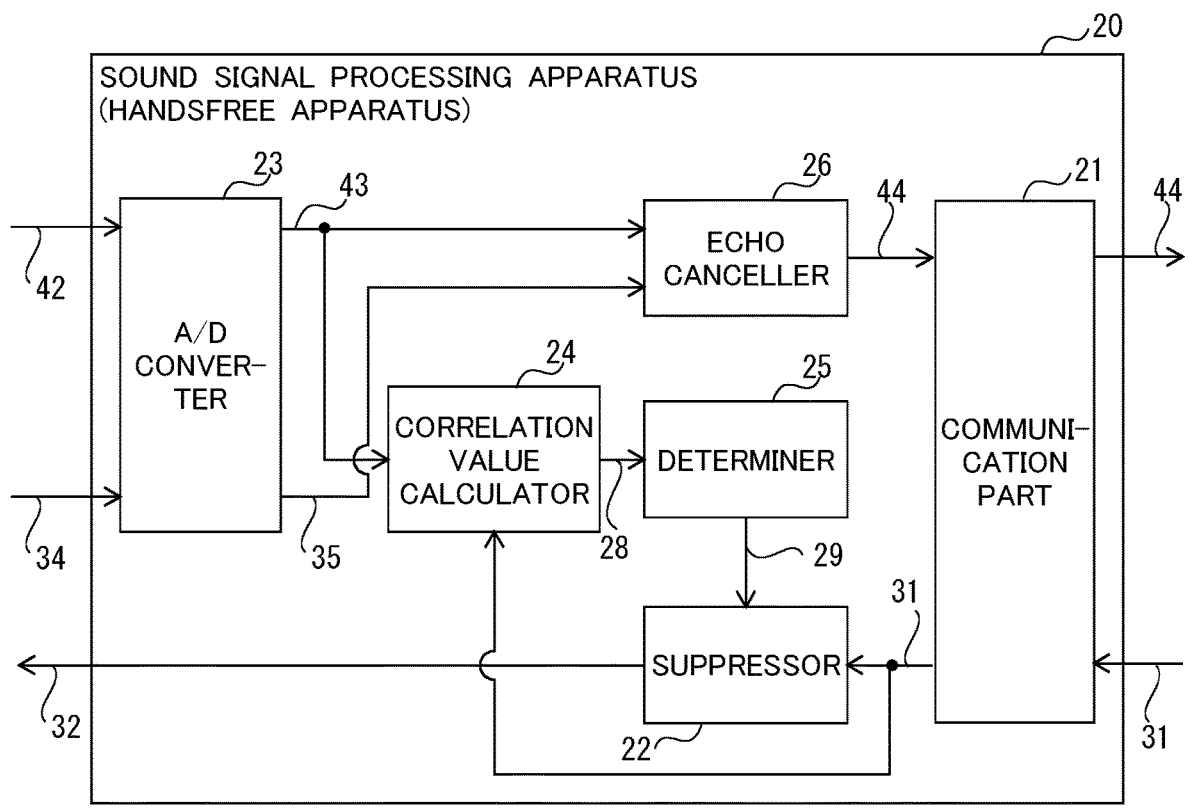
FIG. 2 is a functional block diagram illustrating a configuration of the sound signal processing apparatus shown in FIG. 1.

FIG. 2 is a functional block diagram illustrating a configuration of the sound signal processing apparatus 20 shown in FIG. 1. As shown in FIG. 2, the sound signal processing apparatus 20 includes a communication part 21, a suppressor 22, an analogue-digital (A/D) converter 23, a correlation value calculator 24, a determiner 25, and an echo canceller 26.

The communication part 21 communicates with the smartphone 9 of the driver via near field communication or by wire. Some examples of the near field communication are wireless LAN (Local Area Network) and Bluetooth (registered trademark). The communication by wire is, for example, communication via USB (registered trademark). The communication part 21 receives the far-end sound signal 31 from the smartphone 9, and outputs the received far-end sound signal 31 to the suppressor 22 and the correlation value calculator 24. The communication part 21 receives the sending sound signal 44 from the echo canceller 26, and sends the sending sound signal 44 to the smartphone 9.

The suppressor 22 receives the far-end sound signal 31 from the communication part 21, and receives from the determiner 25 a suppression determination result 29 indicative of whether or not to suppress the far-end sound signal 31. When the received suppression determination result 29 indicates that the far-end sound signal 31 is to be suppressed, the suppressor 22 suppresses the received far-end sound signal 31. The suppressor 22 outputs, to the sound volume adjuster 13, the suppressed far-end sound signal 31 as the far-end sound signal 32. When the received suppression determination result 29 indicates that the far-end sound signal 31 is not suppressed, the suppressor 22 outputs, to the sound volume adjuster 13, the received far-end sound signal 31 not being suppressed, as the far-end sound signal 32.

The A/D converter 23 converts the analogue far-end sound signal 34 received from the amplifier 14 into the digital far-end sound signal 34 to generate a reference sound signal 35. The generated reference sound signal 35 is output to the echo canceller 26. The A/D converter 23 converts the analogue sending sound signal 42 received from the amplifier 17 into the digital sending sound signal 42 so as to generate a sending sound signal 43. The A/D converter 23 outputs the generated sending sound signal 43 to the correlation value calculator 24 and the echo canceller 26.

The A/D converter 23 may includes a converter for converting analogue/digital of the far-end sound signal 34 and a converter for converting analogue/digital of the sending sound signal 42.

The correlation value calculator 24 receives the far-end sound signal 31 from the communication part 21 and the sending sound signal 43 from the A/D converter 23. The correlation value calculator 24 calculates a correlation value 28 indicative of a correlation between the received far-end sound signal 31 and the received sending sound signal 43. The correlation value calculator 24 outputs the calculated correlation value 28 to the determiner 25.

The determiner 25 determines, based on the correlation value 28 received from the correlation value calculator 24, whether or not to suppress the far-end sound signal 31 received from the smartphone 9. The determiner 25 outputs, to the suppressor 22, the suppression determination result 29 indicative of whether to suppress the far-end sound signal 31.

The echo canceller 26 cancels the echo signal included in the sending sound signal 43 received from the A/D converter 23, by use of the reference sound signal 35 received from the A/D converter 23. The echo canceller 26 outputs, to the communication part 21, the sending sound signal 43 from which the echo signal has been cancelled, as the sending sound signal 44.

[2. Operation]

[2.1. Outline]

As shown in FIG. 2, the sound signal processing apparatus 20 receives the sending sound signal 43 as an echo back signal, and receives the far-end sound signal 34 to be input to the loudspeaker 15, as the reference sound signal. The reference sound signal is equivalent to a sound signal of which a volume has been adjusted by the sound volume adjuster 13. The correlation value calculator 24 calculates the correlation value 28 indicative of the correlation between the far-end sound signal 31 and the sending sound signal 43, and outputs the calculated correlation value 28 to the determiner 25. When the correlation value 28 is smaller than a predetermined suppression threshold, the determiner 25 determines to suppress the far-end sound signal 31.

In this case, since the suppressor 22 suppresses the far-end sound signal 31, it is possible to prevent a cracking sound from being generated at the loudspeaker 15. Moreover, since the suppressor 22 suppresses the far-end sound signal 31, linearity of the echo signal included in the sending sound signal 43 can be maintained. As a result, even when the level of the sound output from the loudspeaker 15 is increased, the sound signal processing apparatus 20 prevents the echo signal included in the sending sound signal from remaining in the echo cancellation.

Even when the sound volume adjuster 13 collectively adjusts volumes of a plurality of audios including the radio 11, the CD player 12, and the sound signal processing apparatus 20, the sound signal processing apparatus 20 cancels the sound signal included in the sending sound signal, without considering a characteristic of the sound volume adjuster 13.

[2.2. Detailed Operation]

Figure 3:
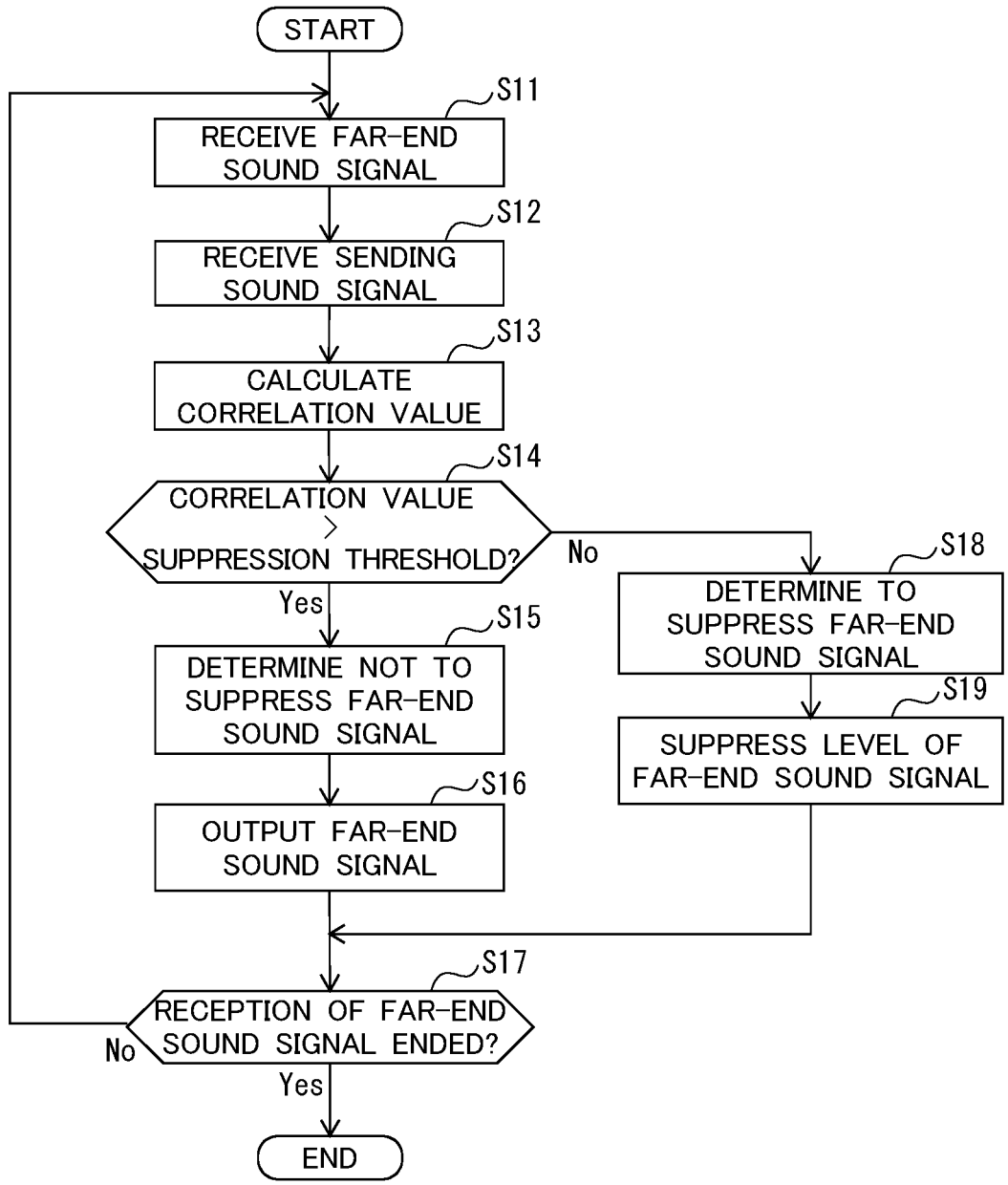
FIG. 3 is a flowchart illustrating an operation of the sound signal processing apparatus shown in FIG. 1.

FIG. 3 is a flowchart illustrating an operation of the sound signal processing apparatus 20 shown in FIG. 1. With reference to FIG. 3, the operation of the sound signal processing apparatus 20 will be described below.

When the communication part 21 receives an off-hook signal that indicates a beginning of communication of the smartphone 9, the sound signal processing apparatus 20 begins a process shown in FIG. 3.

The correlation value calculator 24 receives the far-end sound signal 31 for the calculation of the correlation value (a step S11). More specifically, the correlation value calculator 24 receives the far-end sound signal 31 from the communication part 21 and delays the far-end sound signal 31. A delay time for the far-end sound signal 31 is determined based on, for example, an adjustment time period for the sound volume adjuster 13 to adjust the level of the far-end sound signal 32 and on a distance from the loudspeaker 15 to the microphone 16 because a time period for the far-end sound signal 31 received by the communication part 21 to be included as the echo signal into the sending sound signal 43 depends on the adjustment time period and the distance from the loudspeaker 15 to the microphone 16. The correlation value calculator 24 receives the delayed far-end sound signal 31 in a predetermined sampling time period, from amongst the delayed far-end sound signals 31.

The correlation value calculator 24 receives the sending sound signal 43 (a step S12). More specifically, the A/D converter 23 converts the analogue sending sound signal 42 received from the amplifier 17 so as to generate the sending sound signal 43. The correlation value calculator 24 receives the sending sound signal 43 in the predetermined sampling time period, from amongst the sending sound signals 43 generated by the A/D converter 23.

The correlation value calculator 24 calculates the correlation value 28 indicative of the correlation between the far-end sound signal 31 that has been received in the step S11 and the sending sound signal 43 that has been received in the step S12 (a step S13). More specifically, the correlation value calculator 24 divides a volume level of the far-end sound signal 31 by a predetermined frequency width so as to obtain a frequency spectrum of the far-end sound signal 31. Similarly, the correlation value calculator 24 obtains a frequency spectrum of the sending sound signal 43. The correlation value calculator 24 calculates the correlation value 28 based on the two frequency spectrums. The correlation value 28 indicates the correlation between the far-end sound signal 31 and the echo signal included in the sending sound signal 43. Since the correlation value calculator 24 calculates the correlation value 28 based on those frequency spectrums, the correlation value calculator 24 accurately understands the correlation between the far-end sound signal 31 and the sending sound signal 43. The correlation value calculator 24 calculates a cross-correlation coefficient indicative of a correlation between the obtained two frequency spectrums. The calculated cross-correlation coefficient is used as the correlation value 28. The correlation value calculator 24 outputs the correlation value 28 calculated in the step S13 to the determiner 25.

In this embodiment, the correlation value 28 is equal to or greater than 0 (zero) and equal to or smaller than 1. As the correlation between the two frequency spectrums is higher, the correlation value 28 is closer to 1. In other words, as the correlation value 28 is closer to 1, a waveform of the far-end sound signal 31 is more similar to a waveform of the echo signal included in the sending sound signal 43.

The determiner 25 determines whether or not the correlation value 28 calculated by the correlation value calculator 24 is smaller than the predetermined suppression threshold (a step S14). The predetermined suppression threshold is, for example, 0.6.

When the correlation value 28 is greater than the predetermined suppression threshold (Yes in the step S14), the determiner 25 determines not to suppress the far-end sound signal 31 received by the communication part 21 (a step S15). The determiner 25 outputs, to the suppressor 22, the suppression determination result 29 indicating that the far-end sound signal 31 is not suppressed. When the suppression determination result 29 indicates that the far-end sound signal 31 is not suppressed, the suppressor 22 outputs, to the sound volume adjuster 13, the far-end sound signal 31 received by the communication part 21, as the far-end sound signal 32 (a step S16). Then, the sound signal processing apparatus 20 performs a step S17 described later.

Here will be described a reason for which the far-end sound signal 31 is not suppressed in a case where the correlation value 28 is greater than the predetermined suppression threshold. When the correlation value 28 is greater than the predetermined suppression threshold, the waveform of the far-end sound signal 31 is similar to the waveform of the echo signal included in the sending sound signal 43. In this case, even in a case where the sound volume adjuster 13 adjusts the level of the far-end sound signal 31, a distortion does not occur in the sound output from the loudspeaker 15. Therefore, when the correlation value 28 is greater than the predetermined suppression threshold, the determiner 25 determines that the echo signal included in the sending sound signal 43 can be cancelled without suppressing the far-end sound signal 31.

Figure 4:
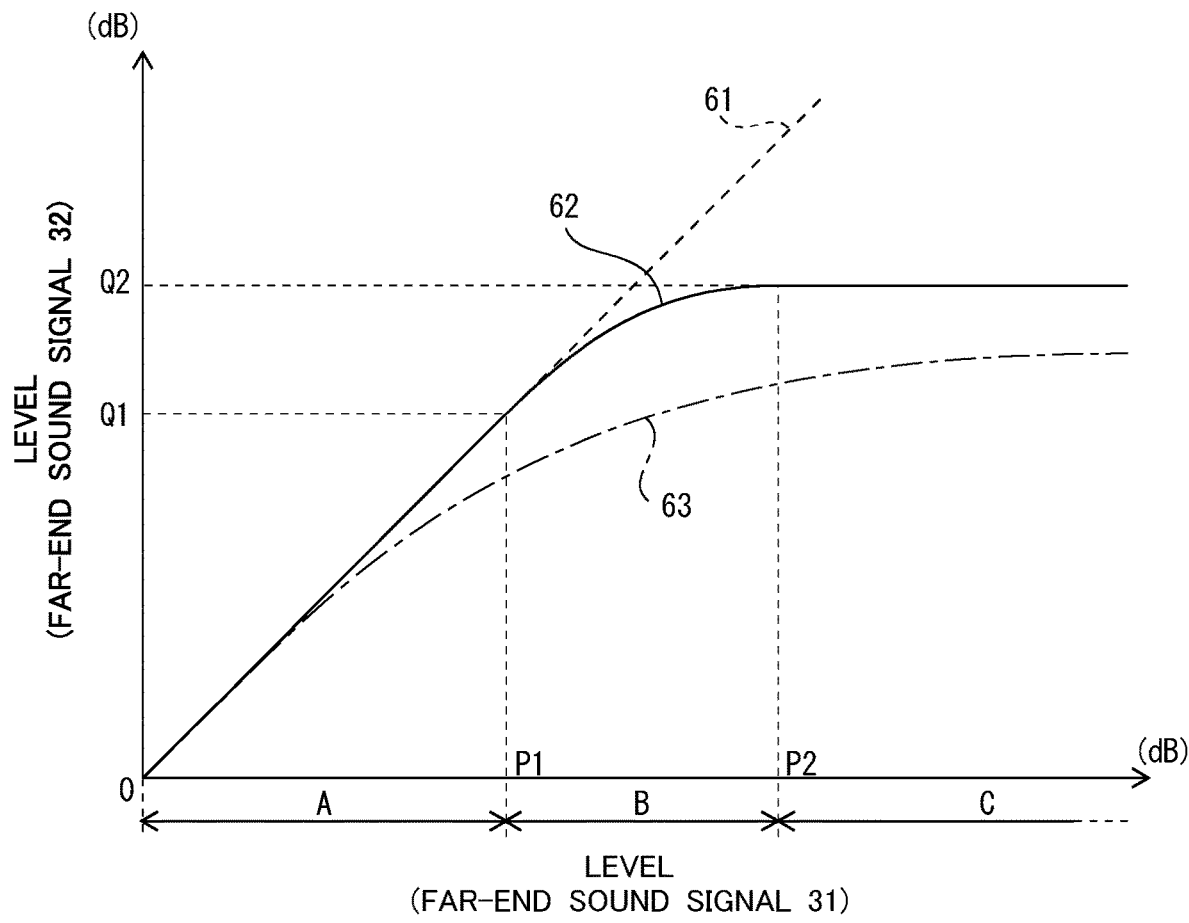
FIG. 4 illustrates a relation between levels of a far-end sound signal before and after a suppression when a determiner shown in FIG. 2 has determined the suppression.

FIG. 4 illustrates a relation between the level of the far-end sound signal 31 and the level of the far-end sound signal 32 when the determiner 25 has determined suppression of the far-end sound signal 31.

As shown in FIG. 4, when the determiner 25 has determined not to suppress the far-end sound signal 31, the suppressor 22 outputs, to the sound volume adjuster 13, the far-end sound signal 31 received from the communication part 21, as the far-end sound signal 32, without adjusting the received far-end sound signal 31. In this case, the level of the far-end sound signal 32 matches the level of the far-end sound signal 31. A characteristic line 61 shows the relation between the level of the far-end sound signal 31 and the level of the far-end sound signal 32 in a case where the far-end sound signal 31 is not suppressed. The characteristic line 61 is a linear line going through an origin of a graph shown in FIG. 4 and having a slope of 1.

Subsequently, the step S14 shown in FIG. 2 will be described. When the correlation value 28 is equal to or smaller than the predetermined suppression threshold (No in the step S14), the determiner 25 determines to suppress the far-end sound signal 31 (a step S18). The determiner 25 outputs, to the suppressor 22, the suppression determination result 29 indicating the far-end sound signal 31 is to be suppressed. Once receiving the suppression determination result 29, the suppressor 22 suppresses the far-end sound signal 31 based on the level of the far-end sound signal 31 (a step S19).

Here will be described a reason for which the far-end sound signal 31 is suppressed in a case where the correlation value 28 is equal to or smaller than the predetermined suppression threshold. When the correlation value 28 is equal to or smaller than the predetermined suppression threshold, the correlation between the far-end sound signal 31 and the echo signal included in the sending sound signal 43 is weak. In other words, the echo signal included in the sending sound signal 43 is distorted relative to the far-end sound signal 31. The distortion of the echo signal is caused by the sound volume adjuster 13 adjusting the level of the far-end sound signal 31. In this case, the echo signal cannot be cancelled fully by the echo canceller 26 that cancels the echo signal included in the sending sound signal 43 by use of the far-end sound signal 31. The distortion caused by the sound volume adjuster 13 adjusting the level of the far-end sound signal 31 is more likely to occur as the level of the far-end sound signal 31 is greater. Thus, the determiner 25 determines to supply the suppressed far-end sound signal 31 to the sound volume adjuster 13 so as to suppress the distortion that occurs in the sound volume adjuster 13.

In accordance with a characteristic line 62 shown in FIG. 4, the suppressor 22 suppresses the far-end sound signal 31 received from the communication part 21. The suppressor 22 stores a table corresponding to the characteristic line 62, and suppresses the far-end sound signal 31 based on the table.

More specifically, when the level of the far-end sound signal 31 is within a range A, a slope of the characteristic line 62 is 1. The range A is 0 (dB) or greater than 0 (dB) and smaller than P1 (dB). When the level of the far-end sound signal 31 is smaller than P1 (dB), the suppressor 22 does not suppress the far-end sound signal 31, regardless of the determination result from the determiner 25. When the level of the far-end sound signal 31 is smaller than P1 (dB), a volume of the sound output from the loudspeaker 15 is relatively small. In this case, there is high possibility that afar end of the telephone doe not recognize an echo component included in the sending sound signal 44. Thus, in a case where the far-end sound signal 31 is suppressed, the driver may not hear the sound output from the loudspeaker 15. The suppressor 22 places a higher priority on easy hearing of sound, regardless of the determination result from the determiner 25.

When the level of the far-end sound signal 31 is within a range B, as the level of the far-end sound signal 31 becomes greater, the slope of the characteristic line 62 is closer to 0. The range B is P1 (dB) or greater than P1 (dB) and smaller than P2 (dB). The suppressor 22 suppresses the far-end sound signal 31 so as to cause the level of the far-end sound signal 32 to be smaller than the level of the far-end sound signal 31. More specifically, the suppressor 22 determines the level of the far-end sound signal 32 based on the level of the far-end sound signal 31 and the characteristic line 62 shown in FIG. 4. The suppressor 22 suppresses the far-end sound signal 31 so that the level of the far-end sound signal 32 matches the determined level.

When the level of the far-end sound signal 31 is P1 (dB) or greater than P1 (dB), the far end of the telephone cannot ignore the echo signal included in the sending sound signal 44 and feels that quality of the sending sound signal is not good. The suppressor 22 suppresses the far-end sound signal 31 as described above so as to suppress the distortion to be caused by the sound volume adjuster 13. Thus, the distortions occurring in the far-end sound signal 34 and the echo signal included in the sending sound signal 43 can be smaller. By use of the far-end sound signal 34 with a small distortion, the sound signal processing apparatus 20 cancels the echo signal with a small distortion so as to prevent the echo signal from remaining in the sending sound signal 44.

Moreover, as the level of the far-end sound signal 31 becomes greater, the slope of the characteristic line 62 is closer to 0 as described above. Since the volume of the sound output from the loudspeaker 15 increases in accordance with an operation for increasing the volume, the driver does not feel strange about a relation between the operation for increasing the volume and the volume of the sound output from the loudspeaker 15.

When the level of the far-end sound signal 31 is within a range C, the slope of the characteristic line 62 is 0, regardless of the level of the far-end sound signal 31. The range C is P2 (dB) or greater than P2 (dB). In this case, the suppressor 22 fixes the level of the far-end sound signal 32 to Q2 (dB), regardless of the level of the far-end sound signal 31 received by the communication part 21. Thus, the reference sound signal 35 and the echo signal included in the sending sound signal 43 are generated based on the far-end sound signal 34 with a small distortion. By use of the far-end sound signal 34 with a small distortion, the sound signal processing apparatus 20 cancels the echo signal with a small distortion so as to prevent the echo component from remaining in the sending sound signal 43 output from the echo canceller 26.

With reference back to FIG. 3, the sound signal processing apparatus 20 determines, after the step S16 or the step S19, whether or not the communication part 21 ended the communication of the smartphone 9 (the step S17).

More specifically, when the communication part 21 has received, from the smartphone 9, an on-hook signal that indicates an end of the communication, the sound signal processing apparatus 20 determines that the communication ended (Yes in the step S17). In this case, the sound signal processing apparatus 20 ends the process shown in FIG. 3. When the communication part 21 has not received the on-hook signal, the sound signal processing apparatus 20 returns to the step S11.

As described above, the sound signal processing apparatus 20 calculates the correlation value 28 indicative of the correlation between the far-end sound signal 31 and the sending sound signal 43. Based on the calculated correlation value 28, the sound signal processing apparatus 20 determines whether or not to suppress the far-end sound signal 31. Thus, without considering the characteristic of the sound volume adjuster 13, the sound signal processing apparatus 20 cancels the echo signal included in the sending sound signal 43 to a degree in which the far end of the communication of the smartphone 9 cannot recognize the echo signal.

Second Embodiment (Configuration)

Figure 5:
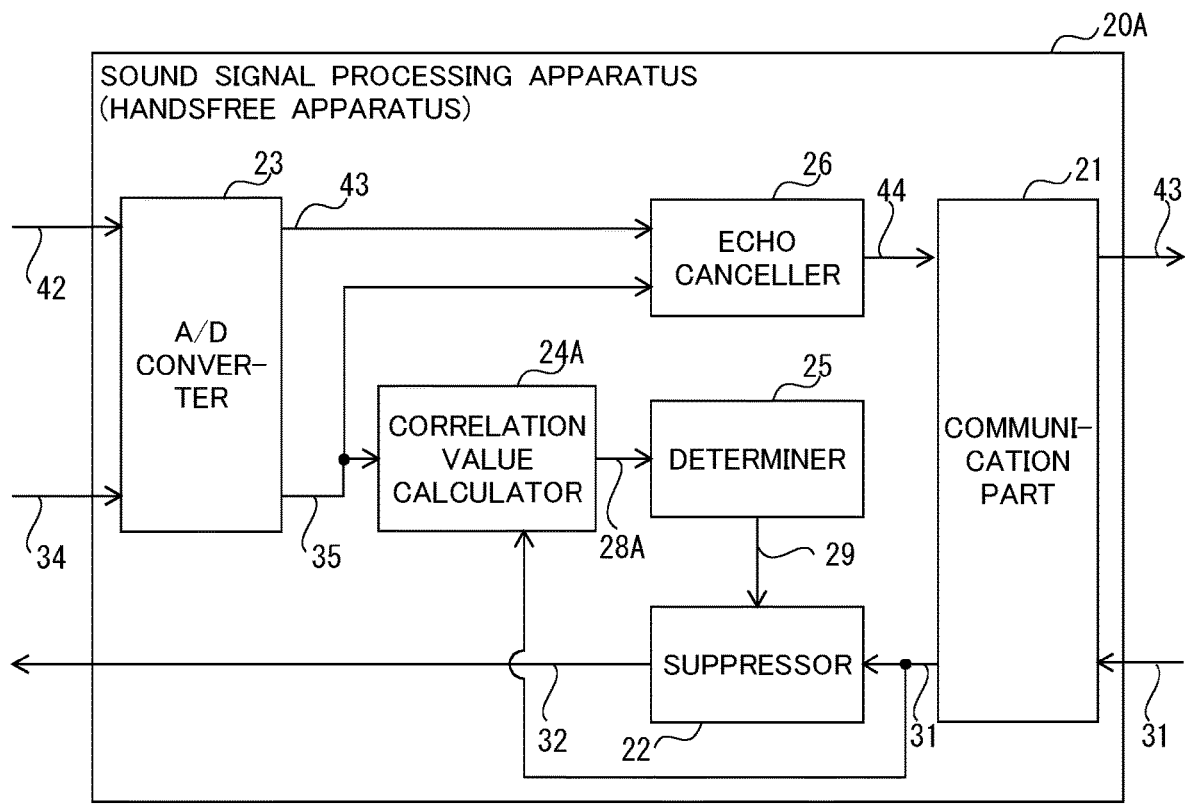
FIG. 5 is a functional block diagram illustrating a configuration of a sound signal processing apparatus of a second embodiment of the invention.

FIG. 5 is a functional block diagram illustrating a configuration of a sound signal processing apparatus 20A of a second embodiment of the invention. Amongst explanations relating to the sound signal processing apparatus 20A, an explanation same as the explanation of the sound signal processing apparatus 20 of the foregoing embodiment described above will be omitted.

As shown in FIG. 5, the sound signal processing apparatus 20A includes a correlation value calculator 24A, instead of the correlation value calculator 24. The correlation value calculator 24A receives a far-end sound signal 31 from a communication part 21 and a reference sound signal 35 from an A/D converter 23. The correlation value calculator 24A calculates a correlation value 28A indicative of a correlation between the far-end sound signal 31 and the reference sound signal 35, and outputs the calculated correlation value 28A to a determiner 25. An algorithm for calculating the correlation value 28A is the same as the algorithm for calculating the correlation value 28 described in the foregoing embodiment.

(Operation)

With reference to FIG. 3, an operation of the sound signal processing apparatus 20A will be described. The sound signal processing apparatus 20A performs different steps from the steps S12 and S13 that are performed by the sound signal processing apparatus 20.

The correlation value calculator 24A receives the far-end sound signal 31 from the communication part 21 (a step S11). The correlation value calculator 24A performs a step to receive the reference sound signal 35, instead of the step S12 in the foregoing embodiment. The reference sound signal 35 is generated from a far-end sound signal 34 output from the sound volume adjuster 13. Therefore, the reference sound signal 35 includes a distortion caused by an adjustment by the sound volume adjuster 13.

The correlation value calculator 24A performs a step, instead of the step S13 in the foregoing embodiment, to calculate the correlation value 28A indicative of the correlation between the far-end sound signal 31 and the reference sound signal 35. The correlation value calculator 24A outputs the calculated correlation value 28A to the determiner 25.

The determiner 25 determines whether or not the correlation value 28A received from the correlation value calculator 24A is greater than a predetermined suppression threshold (a step S14).

When the correlation value 28A is greater than the predetermined suppression threshold (Yes in the step S14), a distortion of an echo signal included in a sending sound signal 43 is relatively small as compared to the far-end sound signal 31 because the far-end sound signal 34 with a small distortion is supplied to a loudspeaker 15 from the amplifier 14. In this case, the determiner 25 determines not to suppress the far-end sound signal 31 (a step S15). Based on the determination result of the determiner 25, the suppressor 22 outputs, to the sound volume adjuster 13, the far-end sound signal 31 received from the communication part 21, as a far-end sound signal 32, without adjusting the received far-end sound signal 31 (a step S16).

When the correlation value 28A is equal to or smaller than the predetermined suppression threshold (No in the step S14), a distortion of the echo signal included in the sending sound signal 43 is relatively large as compared to the far-end sound signal 31. In this case, the echo canceller 26 cannot fully cancel the echo signal included in the sending sound signal 43. The determiner 25 determines to suppress the far-end sound signal 31 in order to reduce the distortion in the echo signal included in the sending sound signal 43 (a step S18). In response to the determination result of the determiner 25, the suppressor 22 suppresses the far-end sound signal 31 (a step S19).

Since the sound volume adjuster 13 adjusts a volume to be output from the loudspeaker 15 by use of the far-end sound signal 32 of which the level is suppressed, the distortion of the echo signal included in the sending sound signal 43 is reduced. The echo canceller 26 cancels the echo signal included in the sending sound signal 43 to a degree in which a far end of the communication of the smartphone 9 cannot recognize the echo signal.

Third Embodiment

Figure 6:
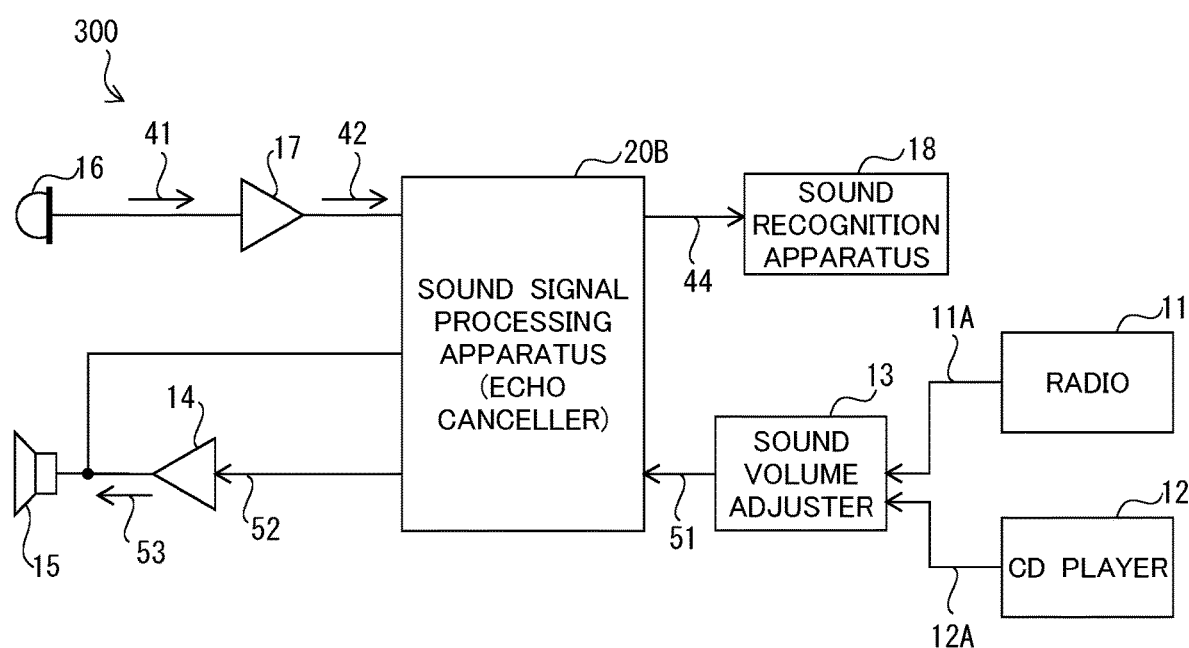
FIG. 6 is a functional block diagram illustrating a configuration of a sound recognition system including a sound signal processing apparatus of a third embodiment of the invention.

FIG. 6 is a functional block diagram illustrating a configuration of a sound recognition system 300 including a sound signal processing apparatus 20B of a third embodiment of the invention. As shown in FIG. 6, the sound recognition system 300 is mounted, for example, on a vehicle, such as a car. The sound recognition system 300 is used as a sound input interface for operating a navigation apparatus mounted on the vehicle.

The sound recognition system 300 includes a radio 11, a CD player 12, a sound volume adjuster 13, an amplifier 14, an amplifier 17, a loudspeaker 15, a microphone 16, a sound recognition apparatus 18, and the sound signal processing apparatus 20B.

The radio 11 receives a radio broadcasting and generates a sound signal 11A. The CD player 12 plays back a CD, not illustrated, and generates a sound signal 12A.

The sound volume adjuster 13 receives a sound signal from one apparatus selected by a driver of the vehicle from amongst the sound signals 11A and 12A. The sound volume adjuster 13 adjusts a volume of the received sound signal to a volume that the driver has been set, and outputs a sound volume adjustment signal 51 to the sound signal processing apparatus 20B.

The amplifier 14 receives a sound volume adjustment signal 52 from the sound signal processing apparatus 20B and amplifies the received sound volume adjustment signal 52. The amplifier 14 outputs the amplified sound volume adjustment signal 52 as a sound volume adjustment signal 53, to the loudspeaker 15 and the sound signal processing apparatus 20B.

The loudspeaker 15 receives the sound volume adjustment signal 53 from the amplifier 14. The loudspeaker 15 converts the received sound volume adjustment signal 53 into a sound, and outputs the sound to a cabin of the vehicle.

The microphone 16 inputs sound in the cabin and generates a sending sound signal 41. The microphone 16 outputs the generated sending sound signal 41 to the amplifier 17. The amplifier 17 amplifies the sending sound signal 41 received from the microphone 16. The amplifier 17 outputs the amplified sending sound signal 41 as a sending sound signal 42 to the sound signal processing apparatus 20B.

The sound recognition apparatus 18 receives the sending sound signal 44 from the sound signal processing apparatus 20B, and recognizes sound input by the driver based on the received sending sound signal 44. The sound recognition apparatus 18 outputs a recognition result of the sound to the navigation apparatus, not illustrated.

The sound signal processing apparatus 20B receives the sound volume adjustment signal 51 from the sound volume adjuster 13, the sound volume adjustment signal 53 from the amplifier 14, and the sending sound signal 42 from the amplifier 17. The sound signal processing apparatus 20B cancels an echo signal included in the sending sound signal 42 by use of the received sound volume adjustment signal 53. Each of the radio 11 and the CD player 12 is equivalent to a sound source of the sound signal processing apparatus 20B.

The sound signal processing apparatus 20B determines whether or not to suppress the received sound volume adjustment signal 51, based on a correlation value indicative of a correlation between the received sound volume adjustment signal 51 and the received sending sound signal 42. When the sound signal processing apparatus 20B has determined not to suppress the received sound volume adjustment signal 51, the sound signal processing apparatus 20B outputs, to the amplifier 14, the received sound volume adjustment signal 51 as the sound volume adjustment signal 52, without suppressing the received sound volume adjustment signal 51. When the sound signal processing apparatus 20B determines to suppress the received sound volume adjustment signal 51, the sound signal processing apparatus 20B suppresses the received sound volume adjustment signal 51 and outputs, to the amplifier 14, the suppressed sound volume adjustment signal 51 as the sound volume adjustment signal 52.

Figure 7:
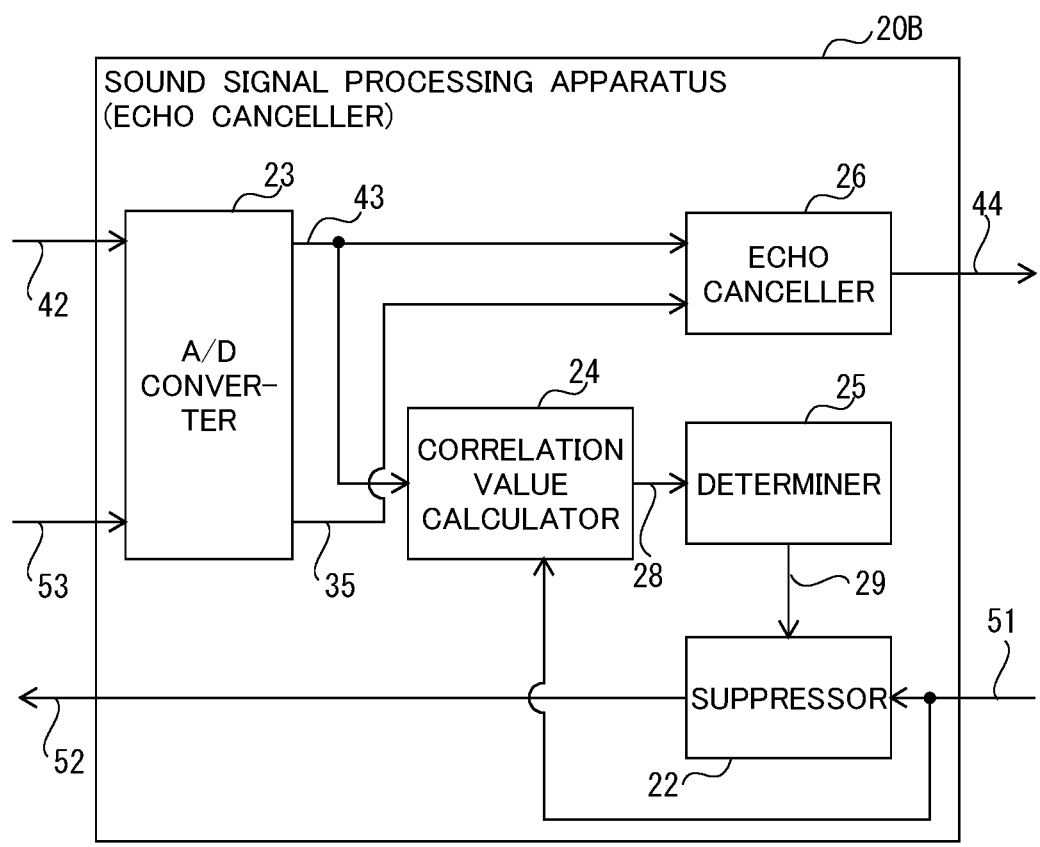
FIG. 7 is a functional block diagram illustrating a configuration of the sound signal processing apparatus shown in FIG. 6.

FIG. 7 is a functional block diagram illustrating a configuration of the sound signal processing apparatus 20B shown in FIG. 6. As shown in FIG. 6, the sound signal processing apparatus 20B has a same configuration as the sound signal processing apparatus 20 shown in FIG. 2 does, except the sound signal processing apparatus 20B does not include the communication part 21 included in the sound signal processing apparatus 20. In FIG. 7, the sound volume adjustment signal 51 corresponds to the far-end sound signal 31 in the foregoing embodiments. The sound volume adjustment signal 52 corresponds to the far-end sound signal 32 in the foregoing embodiments. The sound volume adjustment signal 53 corresponds to the far-end sound signal 34 in the foregoing embodiments.

Since the sound recognition system 300 and the sound signal processing apparatus 20B are configured as described above, the sound recognition system 300 recognizes voice of the driver without lowering a volume of the radio 11 or the CD player 12. This will be described below.

Below will be described is a case, for example, in which a sound output from the loudspeaker 15 is distorted because the amplifier 14 amplifies the sound volume adjustment signal 52 generated from the sound signal 11A of the radio 11. In this case, the distorted sound is input to the microphone 16 so that the echo signal included in the sending sound signal 43 is distorted.

As described above in the foregoing embodiments, when the sound signal to be input to the loudspeaker 15 is distorted, the sound signal processing apparatus 20B cannot effectively cancel the echo signal included in the sending sound signal 43. Therefore, the sound signal processing apparatus 20B performs the process shown in FIG. 4 so as to cancel the echo signal included in the sending sound signal 43.

As described above, even when the sending sound signal 43 includes the echo signal deriving from the sound of the radio output from the loudspeaker 15, the sound signal processing apparatus 20B can cancel the echo signal deriving from the sound of the radio. When the driver of the vehicle inputs his/her voice into the sound recognition system 300, the sound volume adjuster 13 does not need to reduce a level of the sound signal 11A from the radio 11 and a level of the sound signal 12A from the CD player 12.

MODIFICATIONS

In the foregoing embodiment, when the level of the far-end sound signal 31 is P1 (dB) or greater than P1 (dB), the suppressor 22 suppresses the far-end sound signal 31, as an example. However, the suppressor 22 may adjust the level of the far-end sound signal 31 so as to cause the level of the far-end sound signal 32 to be smaller than the level of the far-end sound signal 31, regardless of the level of the far-end sound signal 31. For example, the suppressor 22 may suppress the far-end sound signal 31 in accordance with a characteristic line 63 shown in FIG. 4. As the level of the far-end sound signal 31 becomes greater, a slope of a tangent line of the characteristic line 63 is closer to 0 (zero). Even in this case, a distortion caused by the adjustment by the sound volume adjuster 13 can be prevented.

In the foregoing embodiments, the sound signal processing apparatus is mounted on a handsfree apparatus or a sound recognition apparatus, as an example. However, the invention is not limited to that. An apparatus, a device, a unit, etc. on which the sound signal processing apparatus is mounted is not limited. For example, the sound signal processing apparatus in the foregoing embodiment may be mounted on an ICC (In Car Communication) apparatus or another audio apparatus.

In the foregoing embodiments, the sound signal processing apparatus includes the echo canceller 26, as an example. However, the invention is not limited to that. The sound signal processing apparatus may not include the echo canceller 26. In this case, a distortion of a sound output from the loudspeaker can be prevented. Thus, a user can easily recognize the sound output from the loudspeaker.

Each of the functional blocks of the sound signal processing apparatuses in the foregoing embodiments may be configured as one chip by use of a semiconductor, such as an LSI. Further, a portion or all of the blocks may be configured as one chip.

Here, the LSI is an example of the semiconductor. The semiconductor is referred to also as IC, system LSI, super LSI, or ultra LSI, depending on a degree of concentration.

Further, a method of the integrated circuit is not limited to the LSI. The integrated circuit may be a specific circuit or a general purpose processor. A field programmable gate array (FPGA) that is programmable after LSI production or a reconfigurable processor in which a connection between circuit cells or setting of the LSI can be reconfigurable may be used.

A portion or all of the processes performed by the functional blocks of the foregoing embodiments may be performed by a program, and a portion or all of the processes performed by the functional blocks in the foregoing embodiments may be implemented by a central processing unit (CPU) of a computer. A program to perform each of the processes is stored in a memory, such as a hard disk, a ROM, etc. The program is executed after being read out to a ROM or a RAM.

The processes of the foregoing embodiments may be implemented by hardware or software (including collaboration with an operating system (OS), middleware, or a predetermined library). Further, the processes of the foregoing embodiments may be performed by a combination of software and hardware.

Figure 8:
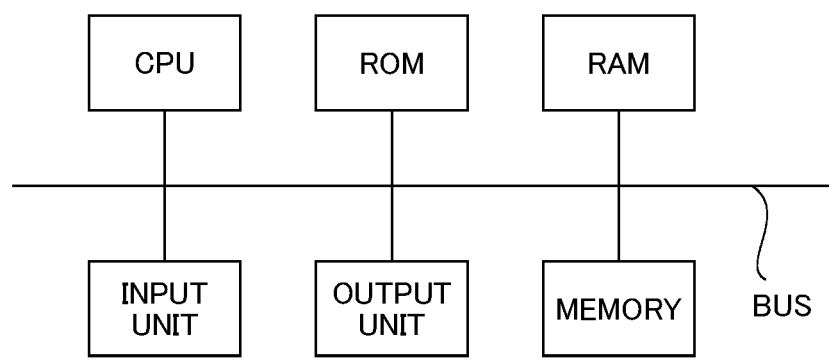
FIG. 8 is a configuration of a CPU bus.

For example, in a case where each functional block of the foregoing embodiments (including the modifications) is realized by software, each functional may be realized by software by use of a hardware configuration shown in FIG. 8 (e.g., the hardware configuration connecting, via bus, a CPU, a ROM, a RAM, an input unit, an output unit, etc.).

An order of performing each of the processes in the foregoing embodiments is not limited to the order described in the foregoing embodiments. The order of performing each process may be changed without departing from the purpose of the invention.

A computer program that causes a computer to implement the foregoing processes and a computer-readable recording medium that stores the computer program are included in the scope of the invention. Here, some examples of the computer-readable recording media are a flexible disk, a hard disk, a CD-ROM, a MO, a DVD, a DVD-ROM, a DVD-RAM, a large capacity DVD, a next generation DVD, and a semiconductor memory.

The computer program is not limited to a program stored in the foregoing recording medium. The computer program may be transmitted via an electrical communication line, wireless transmission, a wired communication line, a network, typically the Internet, etc.

Some embodiments of the invention are described above. However, those embodiments are only examples of the invention. Therefore, the invention is not limited to those embodiments, and the embodiments and the modifications of the invention can be properly modified to implement the invention without departing from the purpose of the invention.

While the invention has been shown and described in detail, the foregoing description is in all aspects illustrative and not restrictive. It is therefore understood that numerous other modifications and variations can be devised without departing from the scope of the invention.

What is claimed is:

1. A sound signal processing apparatus that receives a first sound signal from a sound source and that outputs the first sound signal to a volume adjuster that outputs a volume-adjusted sound signal to a speaker, the sound signal processing apparatus comprising:
    a correlation value calculator that calculates a correlation value indicative of a correlation between the first sound signal and a second sound signal that includes an echo signal deriving from the first sound signal;
    a determiner that determines, based on the correlation value calculated by the correlation value calculator, whether or not to suppress a level of the first sound signal, the determiner suppressing the level of the first sound signal when the calculated correlation value is equal to or smaller than a predetermined suppression threshold, and the determiner not suppressing the level of the first sound signal when the calculated correlation value is larger than the predetermined suppression threshold; and
    a suppressor that, when the determiner has determined to suppress the level of the first sound signal, suppresses the level of the first sound signal, and outputs, to the volume adjuster, the first sound signal having the level that has been suppressed, the volume adjuster then volume adjusting the first sound signal having the level that has been suppressed to output the volume-adjusted first sound signal to the speaker.

2. The sound signal processing apparatus according to claim 1, wherein
    the correlation value calculator calculates the correlation value based on a frequency spectrum of the first sound signal and a frequency spectrum of the second sound signal.

3. The sound signal processing apparatus according to claim 1, wherein
    when the determiner has determined to suppress the level of the first sound signal and the level is equal to or greater than a predetermined threshold, the suppressor suppresses the level of the first sound signal.

4. A sound signal processing apparatus that receives a first sound signal from a sound source and that outputs the first sound signal to a volume adjuster that outputs a volume-adjusted sound signal to a speaker, the sound signal processing apparatus comprising:
    a correlation value calculator that calculates a correlation value indicative of a correlation between the first sound signal and a second sound signal, the second sound signal having been generated by the volume adjuster adjusting a level of the first sound signal;
    a determiner that determines, based on the correlation value calculated by the correlation value calculator, whether or not to suppress the level of the first sound signal, the determiner suppressing the level of the first sound signal when the calculated correlation value is equal to or smaller than a predetermined suppression threshold, and the determiner not suppressing the level of the first sound signal when the calculated correlation value is larger than the predetermined suppression threshold; and
    a suppressor that, when the determiner has determined to suppress the level of the first sound signal, suppresses the level of the first sound signal, and outputs, to the volume adjuster, the first sound signal having the level that has been suppressed, the volume adjuster then volume adjusting the first sound signal having the level that has been suppressed to output the volume-adjusted first sound signal to the speaker.

5. A sound signal processing method in which a first sound signal is received from a sound source and the first sound signal that has been received is output to a volume adjuster that outputs a volume-adjusted sound signal to a speaker, the sound signal processing method comprising the steps of:
    calculating a correlation value indicative of a correlation between the first sound signal and a second sound signal that includes an echo signal deriving from the first sound signal;
    determining, based on the correlation value calculated by the calculating, whether or not to suppress a level of the first sound signal, so that the level of the first sound signal is suppressed when it has been determined that the calculated correlation value is equal to or smaller than a predetermined suppression threshold, and so that the level of the first sound signal is not suppressed when it has been determined that the calculated correlation value is larger than the predetermined suppression threshold; and
    when the determining has determined to suppress the level of the first sound signal, suppressing the level of the first sound signal, and outputting, to the volume adjuster, the first sound signal having the level that has been suppressed, the volume adjuster then volume adjusting the first sound signal having the level that has been suppressed to output the volume-adjusted first sound signal to the speaker.

6. A sound signal processing method in which a first sound signal is received from a sound source and the first sound signal that has been received is output to a volume adjuster that outputs a volume-adjusted sound signal to a speaker, the sound signal processing method comprising the steps of:
    calculating a correlation value indicative of a correlation between the first sound signal and a second sound signal, the second sound signal having been generated by the volume adjuster adjusting a level of the first sound signal;
    determining, based on the correlation value calculated by the calculating, whether or not to suppress the level of the first sound signal, so that the level of the first sound signal is suppressed when it has been determined that the calculated correlation value is equal to or smaller than a predetermined suppression threshold, and so that the level of the first sound signal is not suppressed when it has been determined that the calculated correlation value is larger than the predetermined suppression threshold; and when the determining has determined to suppress the level of the first sound signal, suppressing the level of the first sound signal, and outputting, to the volume adjuster, the first sound signal having the level that has been suppressed, the volume adjuster then volume adjusting the first sound signal having the level that has been suppressed to output the volume-adjusted first sound signal to the speaker.

* * * * *